(12) United States Patent
Zhu et al.

(10) Patent No.: US 11,101,523 B2
(45) Date of Patent: Aug. 24, 2021

(54) BATTERY PACK

(71) Applicant: CONTEMPORARY AMPEREX TECHNOLOGY CO., LIMITED, Fujian (CN)

(72) Inventors: Xianchun Zhu, Fujian (CN); Chao Zeng, Fujian (CN); Hua Cao, Fujian (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 0 days.

(21) Appl. No.: 17/133,370

(22) Filed: Dec. 23, 2020

(65) Prior Publication Data

US 2021/0119301 A1  Apr. 22, 2021

Related U.S. Application Data

(63) Continuation of application No. PCT/CN2019/094388, filed on Jul. 2, 2019.

(30) Foreign Application Priority Data

Apr. 30, 2019 (CN) .......................... 201920620835.5

(51) Int. Cl.
*H01M 50/383* (2021.01)
*H01M 50/249* (2021.01)
(Continued)

(52) U.S. Cl.
CPC ....... *H01M 50/383* (2021.01); *H01M 10/425* (2013.01); *H01M 10/486* (2013.01);
(Continued)

(58) Field of Classification Search
CPC ............. H01M 50/383; H01M 50/249; H01M 50/581; H01M 50/204; H01M 50/375;
(Continued)

(56) References Cited

U.S. PATENT DOCUMENTS 8,809,743 B2  8/2014  Suzuki et al.
2008/0198897 A1  8/2008  Suzuki et al.
(Continued)

FOREIGN PATENT DOCUMENTS

CN         108493523 A    9/2018
WO      WO-2019150704    *  8/2019  ............ H01M 50/50

*Primary Examiner* — Basia A Ridley
*Assistant Examiner* — Heng M. Chan
(74) *Attorney, Agent, or Firm* — Scully Scott Murphy & Presser

(57) ABSTRACT

The present application relates to a battery pack. The battery pack comprises: two or more battery modules, each of the battery modules comprising a plurality of battery cells which are stacked in sequence, wherein each of the battery cells is provided with an explosion-proof valve; the battery pack further comprising a thermal alarm device and a battery management system, wherein the thermal alarm device is arranged corresponding to the explosion-proof valve; the thermal alarm device and the battery management system are connected to form a circuit; and a break of the circuit can be caused when the explosion-proof valve is exploded. The present application provides the thermal alarm device, and when thermal runaway occurs in the battery module, a circuit break is formed between the thermal alarm device and the battery management system, thus the thermal runaway status of the battery pack can be accurately reflected.

18 Claims, 4 Drawing Sheets

(51) Int. Cl.
  *H01M 50/581* (2021.01)
  *H01M 50/204* (2021.01)
  *H01M 50/375* (2021.01)
  *H01M 10/42* (2006.01)
  *H01M 10/48* (2006.01)

(52) U.S. Cl.
  CPC ....... *H01M 50/204* (2021.01); *H01M 50/249* (2021.01); *H01M 50/375* (2021.01); *H01M 50/581* (2021.01); *H01M 2010/4271* (2013.01)

(58) Field of Classification Search
  CPC ............. H01M 10/425; H01M 10/486; H01M 2010/4271
  See application file for complete search history.

(56) References Cited

U.S. PATENT DOCUMENTS

| | | | |
|---|---|---|---|
| 2015/0023392 A1 | 1/2015 | Noh | |
| 2018/0172770 A1* | 6/2018 | Sun | B60L 3/12 |
| 2019/0305287 A1* | 10/2019 | Matsui | H01M 50/317 |
| 2021/0050582 A1* | 2/2021 | Yoshida | H01M 50/503 |
| 2021/0126328 A1* | 4/2021 | Egashira | H01M 50/183 |

\* cited by examiner

BATTERY PACK

CROSS-REFERENCE TO RELATED APPLICATIONS

This application is a continuation of International Application No. PCT/CN2019/094388, filed on Jul. 2, 2019, which claims priority to Chinese Patent Application No. 201920620835.5, filed on Apr. 30, 2019. The disclosures of the aforementioned applications are hereby incorporated by reference in their entireties.

TECHNICAL FIELD

The present application relates to the field of energy storage devices, and in particular to a battery pack.

BACKGROUND

At present, with the increasing energy density of power batteries, the market demand for battery safety is higher and higher. In the case of abuse, the battery is prone to thermal runaway, and rapid formation of high temperature and destructive power, which may burn through an upper cover of a battery case and catch the fire, thereby causing a great safety accident.

In the prior art, the temperature is only collected inside a battery module and the collected signal is transmitted to a vehicle control system, however, sometimes a false signal would occur and lead to a misjudgment.

SUMMARY

The present application provides a battery pack to solve the problem in the prior art and improve the alarm accuracy for thermal runaway of the battery module.

The present application provides a battery pack, comprising: two or more battery modules, each of the battery modules comprising a plurality of battery cells which are stacked in sequence, wherein each of the battery cells is provided with an explosion-proof valve;

the battery pack further comprising a thermal alarm device and a battery management system, wherein the thermal alarm device is arranged corresponding to the explosion-proof valve;

the thermal alarm device and the battery management system are connected to form a circuit; and a break of the circuit can be caused when the explosion-proof valve is exploded.

Preferably, the thermal alarm device comprises a plurality of fusible conductive members which are connected in series; and the conductive member is fused when the explosion-proof valve is exploded.

Preferably, the conductive member is a conductive tape.

Preferably, the conductive member is strip-shaped, and the conductive member extends in the direction in which the explosion-proof valves are arranged.

Preferably, the thermal alarm device further comprises an intermediate wire harness, a first lead-out wire harness and a second lead-out wire harness;

the conductive members are connected end to end via the intermediate wire harness; and an end of the conductive member located at a head end is connected to the first lead-out wire harness, and an end of the conductive member located at a tail end is connected to the second lead-out wire harness.

Preferably, each of the intermediate wire harness, the first lead-out wire harness and the second lead-out wire harness have conductive terminals which are fixed with the conductive member.

Preferably, the thermal alarm device further comprises a fastener;

the conductive member is provided with a first hole;

the conductive terminal is provided with a second hole; and the fastener fixes the conductive member and the conductive terminal after passing through the first hole and the second hole.

Preferably, the battery module further comprises a side plate which is fixed on a side of the battery cell, an end plate which is fixed on an end of the battery cell, and an upper cover which is fixed above the battery cell and is connected to the side plate and the end plate; and the thermal alarm device is provided on the upper cover.

Preferably, the upper cover is made of plastic.

Preferably, the battery pack further comprises a vehicle control module; and the battery management system is used for sending a first alarm signal to the vehicle control module when the break of the circuit is caused.

The technical solutions provided by the present application can achieve the following beneficial effects:

the present application provides a battery pack, comprising two or more battery modules, each of the battery modules comprising a plurality of battery cells which are stacked in sequence, wherein each of the battery cells is provided with an explosion-proof valve; the battery pack further comprises a thermal alarm device, the thermal alarm device being arranged corresponding to the explosion-proof valve; and the battery pack further comprises a battery management system, the thermal alarm device and the battery management system are connected to form a circuit, and when thermal runaway occurs in the battery module, the explosion-proof valve is exploded, and fire exploded from the explosion-proof valve and a high-temperature gas and liquid of an electrolytic solution cause a circuit break. The present application provides the thermal alarm device to correspond to the explosion-proof valve, and when thermal runaway occurs in the battery module, a circuit break of the thermal alarm device is caused, thus the thermal runaway status of the battery pack can be accurately reflected, and the safety of the battery is enhanced.

It should be understood that the above general description and the following detailed description are merely exemplary, and could not limit the present application.

BRIEF DESCRIPTION OF DRAWINGS

In order to illustrate the technical solutions in the particular embodiments of the present application or in the prior art more clearly, the accompanying drawings to be used in the description of the particular embodiments or the prior art will be briefly introduced below; obviously, the accompanying drawings in the following description show some of the embodiments of the present application, and those of ordinary skill in the art may still derive other drawings from these accompanying drawings without creative effort.

REFERENCE NUMERALS

100—Battery pack;
  1—Battery module;
    11—Battery cell;
      111—Explosion-proof valve;
      112—Housing;
      113—Electrode assembly;
      114—Top cover assembly;
    12—Side plate;
    13—Upper cover;
    14—End plate;
  2—Thermal alarm device;
    21—conductive member;
      211—First hole;
      A-Head end;
      B-Tail end;
    22—Intermediate wire harness;
      221—Conductive terminal;
        221a—Second hole;
    23—First lead-out wire harness;
    24—Second lead-out wire harness;
    25—Fastener.

The accompanying drawings herein are incorporated into and constitute a part of the description, illustrate embodiments consistent with the present application, and are used together with the description to explain the principles of the present application.

DESCRIPTION OF EMBODIMENTS

The technical solutions of the present application will be clearly and completely described in conjunction with the drawings as below, and obviously, the described embodiments are merely some, rather than all, of the embodiments of the present application. Based on the embodiments of the present application, all other embodiments obtained by those of ordinary skill in the art without any inventive effort all fall within the scope of protection of the present application.

Figure 1:
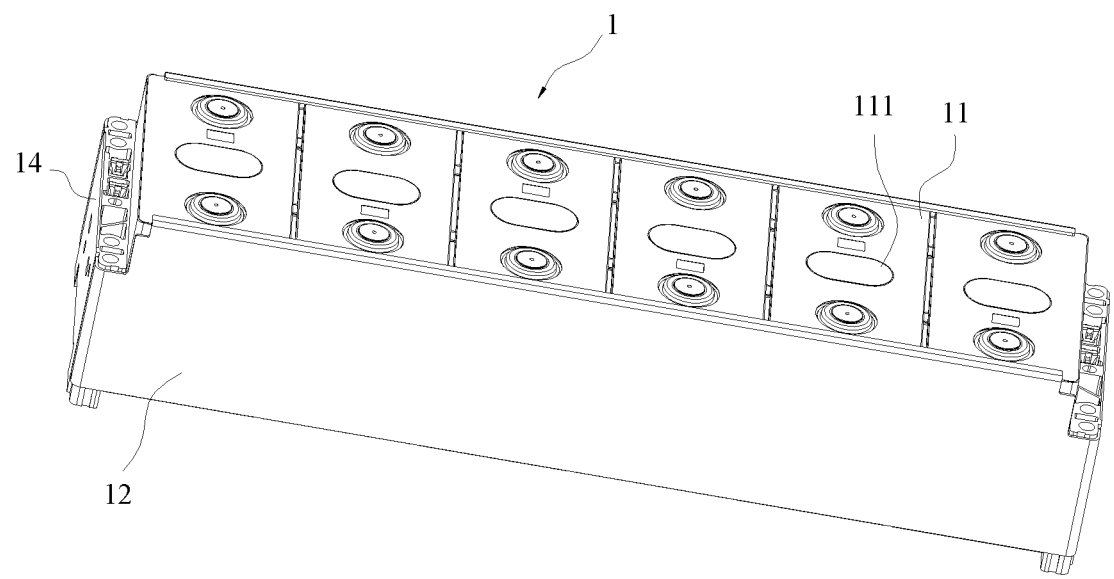
FIG. 1 is a partial structural schematic diagram of a battery module in a battery pack provided by an embodiment of the present application.
Figure 2:
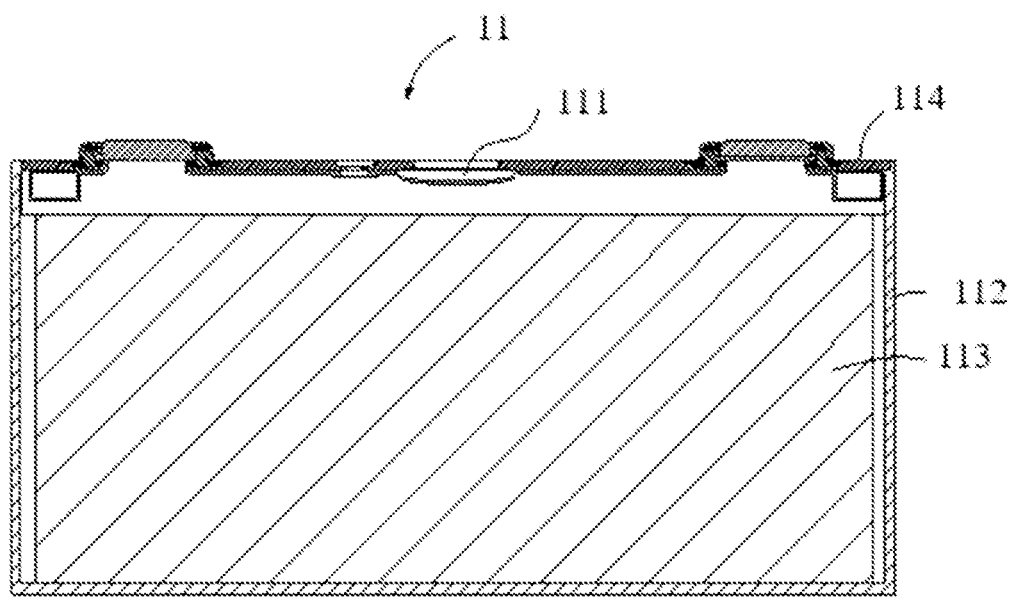
FIG. 2 is a structural main cross-sectional view of a battery cell.
Figure 3:
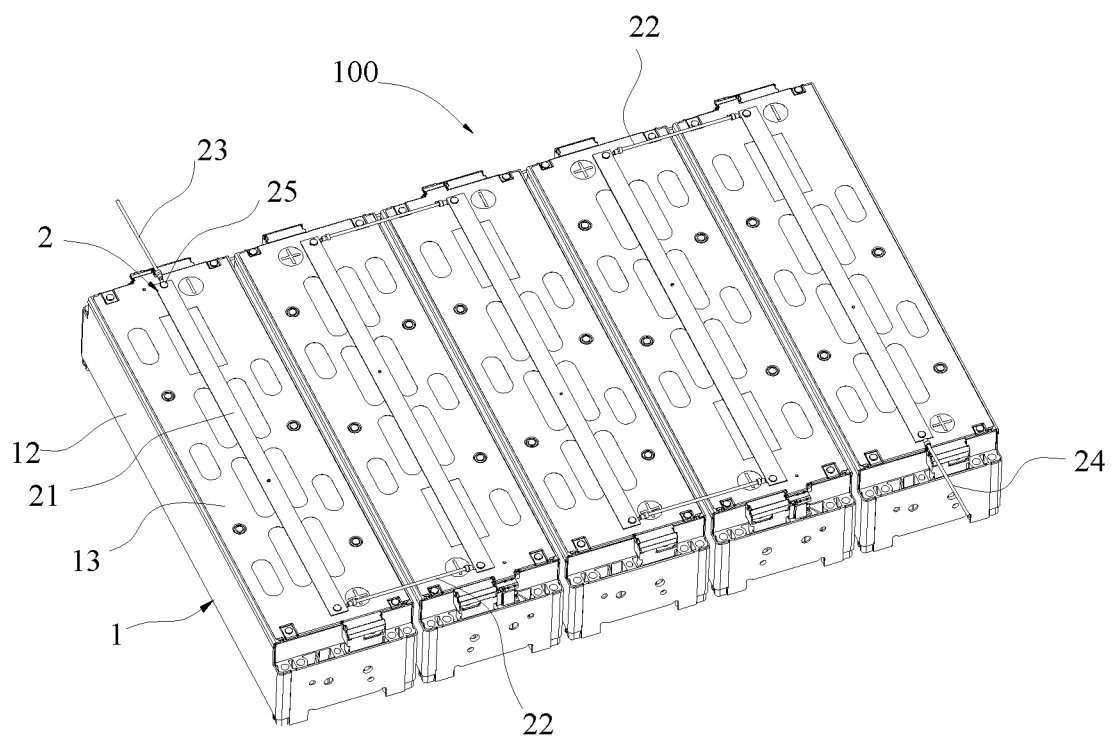
FIG. 3 is a schematic structural diagram of the battery pack provided by an embodiment of the present application.
Figure 4:
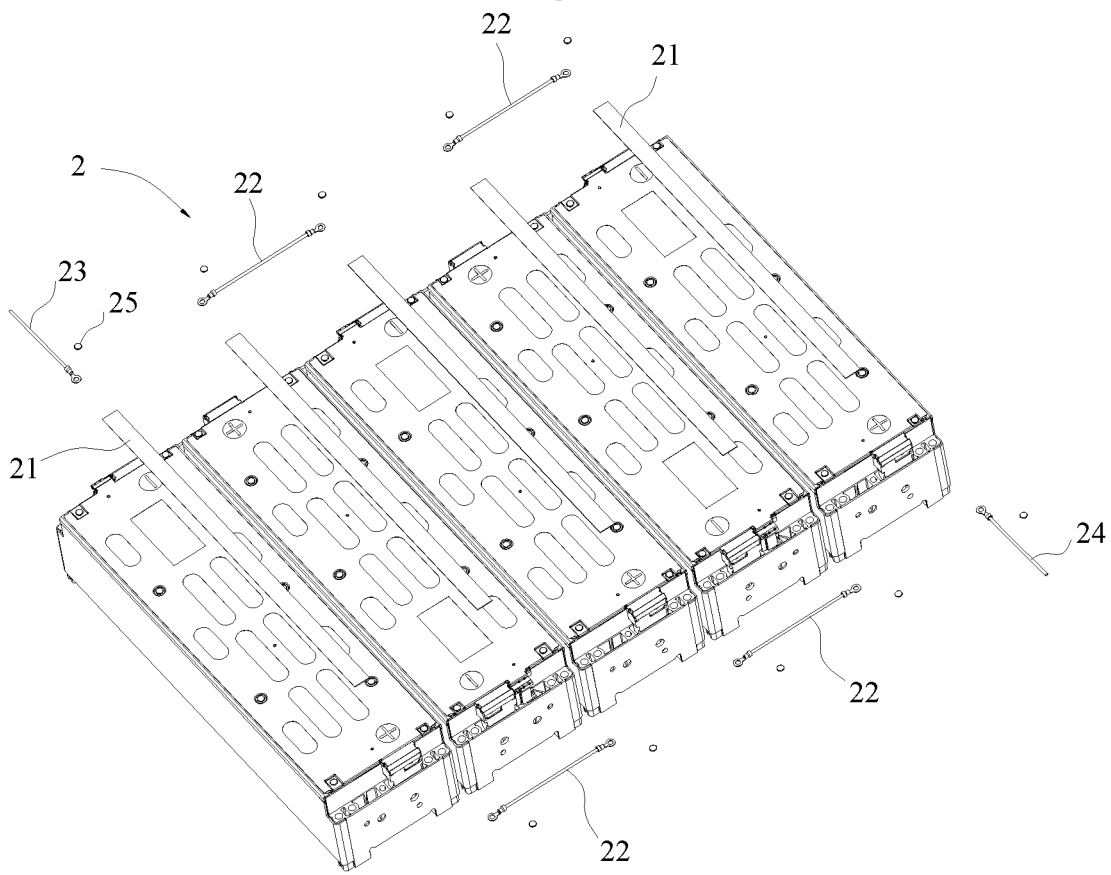
FIG. 4 is an exploded structural view of a thermal alarm device in the battery pack provided by an embodiment of the present application.

FIG. 1 is a partial structural schematic diagram of a battery module in a battery pack provided by an embodiment of the present application; FIG. 2 is a structural main cross-sectional view of a battery cell; FIG. 3 is a schematic structural diagram of the battery pack provided by an embodiment of the present application; and FIG. 4 is an exploded structural view of the battery pack provided by an embodiment of the present application.

An embodiment of the present application provides a battery pack 100, the battery pack 100 comprising: two or more battery modules 1, as shown in FIG. 1, each of the battery modules 1 comprising a plurality of battery cells 11 which are stacked in sequence.

The battery cell 11 comprises a housing 112, an electrode assembly 113 and a top cover assembly 114 as shown in FIG. 2. The housing 112 may be in a hexahedral shape or the other shapes. The housing 112 has an internal space for accommodating the electrode assembly 113 and an electrolytic solution. The housing 112 may be made of a material such as aluminum, aluminum alloy or plastic.

The electrode assembly 113 can be formed by winding a first electrode plate, a second electrode plate and a membrane together around a winding axis in a spiral manner, wherein the membrane is an insulator which is sandwiched between the first electrode plate and the second electrode plate.

The top cover assembly 114 covers an opening of the housing 112, an explosion-proof valve 111 is provided on the top cover assembly 114, and electric energy is output after the electrode assembly 113 reacts with the electrolytic solution. If the battery is overcharged or in the other cases, the electrolytic solution inside the battery cell would erupt at a high temperature, and the erupted electrolytic solution would be ejected from the explosion-proof valve 111.

As shown in FIG. 3 and FIG. 4, the battery pack 100 further comprises a thermal alarm device 2, the thermal alarm device 2 being arranged corresponding to the explosion-proof valve 111. The battery pack 100 further comprises a battery management system (not shown). The thermal alarm device 2 and the battery management system are connected to form a circuit. A break of the circuit can be caused when the explosion-proof valve 111 is exploded.

When the explosion-proof valve 111 is exploded, an electrolytic solution gas or liquid or fire in the battery cell 110 is erupted, that is to say, thermal runaway occurs in the battery module 1. At this time the circuit break is caused between the thermal alarm device 2 and the battery management system. It can be understood that the thermal alarm device 2 can be arranged in any position of the battery module 1, as long as the thermal alarm device can correspond to the explosion-proof valve 111. When thermal runaway occurs in the battery module 1, the heat discharged from the explosion-proof valve 111 is able to fuse the thermal alarm device 2 until the circuit is disconnected.

The circuit-break signal is fed back to the battery management system so as to obtain accurate information of thermal runaway status. An alarm such as an alarm light or a buzzer can also be connected in series in the circuit to give an alarm.

As a preferred implementation, the thermal alarm device 2 can comprise a plurality of fusible conductive members 21, wherein the conductive members 21 are connected in series. When the explosion-proof valve 111 is exploded, the fire, gas or liquid ejected from the position of the explosion-proof valve 111 can fuse the conductive member 21, and then cause the circuit break.

As a preferred implementation, the above-mentioned conductive member 21 is a conductive tape. The conductive tape is lightweight and convenient, is easy to operate in a fixed manner on the battery module 1, and can be directly pasted on the module. Through the calculation of the thickness and other dimensions of the conductive tape, a conductive tape with an appropriate specification is selected, so that the conductive tape can be fused when the instant heat in and around the explosion-proof valve 111 quickly reaches a heat threshold.

Preferably, the conductive member 21 is strip-shaped. According to a stack direction of the battery cells 11, the explosion-proof valves 111 are arranged in a line. As shown in FIG. 3 and FIG. 4, the battery cells 11 are stacked in sequence, the strip-shaped conductive members 21 exactly correspond to the explosion-proof valves 111 which are arranged in a line, thus it can timely and accurately reflect whether thermal runaway occurs in the battery module 1 or not. In addition, the strip-shaped conductive members 21 do not occupy too much space of the battery module 1, thereby avoiding interference with components in the original design, thus preventing the battery module 1 from many adaptive designs.

Figure 5:
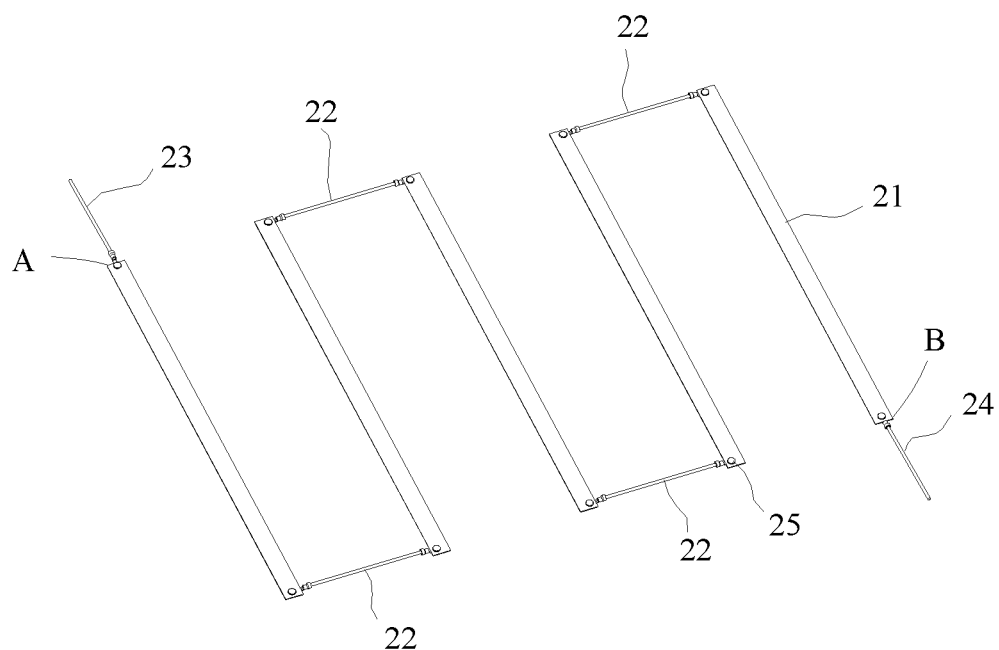
FIG. 5 is a schematic diagram of the connection relationship of the thermal alarm device.
Figure 6:
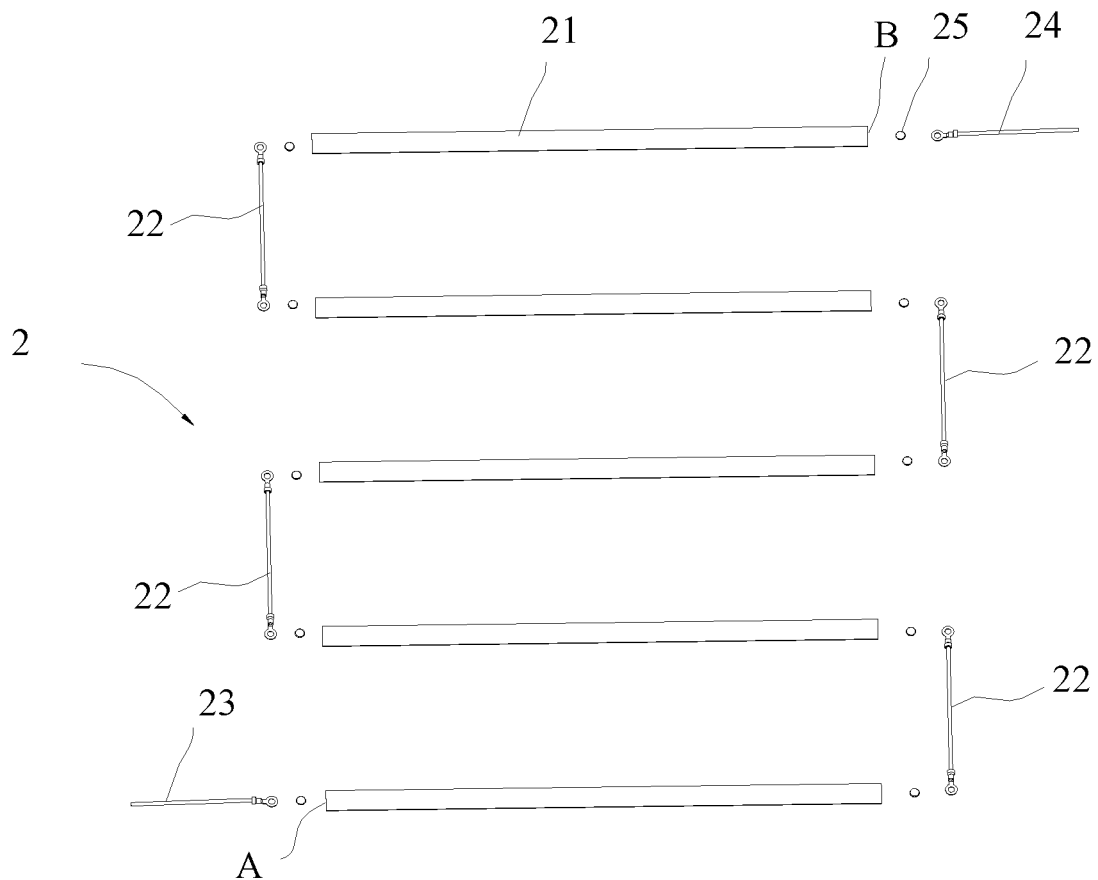
FIG. 6 is an exploded view of the connection relationship of the thermal alarm device.

FIG. 5 is a schematic diagram of the connection relationship of the thermal alarm device. FIG. 6 is an exploded view of the connection relationship of the thermal alarm device. With reference to FIG. 3 to FIG. 6, the thermal alarm device 2 further comprises an intermediate wire harness 22, a first lead-out wire harness 23 and a second lead-out wire harness 24. The conductive members 21 can be connected end to end via the intermediate wire harness 22. An end of the conductive member 21 located at a head end A is provided with the first lead-out wire harness 23, an end of the conductive member 21 located at a tail end B is provided with the second lead-out wire harness 24, and both the first lead-out wire harness 23 and the second lead-out wire harness 24 are connected to an external circuit board to form a circuit.

Figure 7:
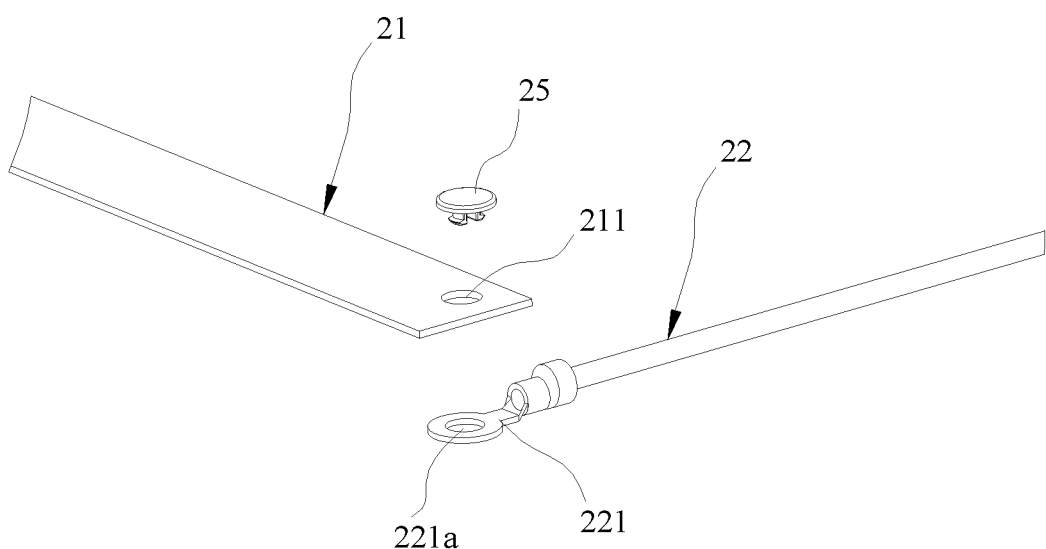
FIG. 7 is a partial enlarged view of FIG. 6.

Further, each of the intermediate wire harness 22, the first lead-out wire harness 23 and the second lead-out wire harness 24 has a conductive terminal 221. With reference to FIG. 7, taking the intermediate wire harness 22 as an example, the intermediate wire harness 22 comprises the conductive terminal 221, the conductive terminal 221 is fixed with the conductive member 21, the conductive terminal 221 can be a copper terminal, and the copper has a good electrical conductivity, so when the above-mentioned circuit is connected or disconnected, there is a low probability of false signal. This embodiment is illustrated by taking the conductive terminal 221 of the intermediate wire harness 22 as an example, it can be understood by those skilled in the art that the conductive terminal contained in the first lead-out wire harness 23 and the second lead-out wire harness 24 has the same structure as the conductive terminal 221 of the intermediate wire harness 22, which will not be repeated here for brevity.

If the conductive member 21 is the conductive tape, the conductive tape can be fixed to the conductive terminal 221 in an adhesive manner. Preferably, as shown in FIG. 7, the thermal alarm device 2 further comprises a fastener 25. The conductive member 21 and the conductive terminal 221 can be fixed via the fastener 25. The fastener 25 can also fix the conductive member 21 and the conductive terminal 221, and then is fixed on the battery module 1. Specifically, in the battery pack 100 provided by an embodiment of the present application, the thermal alarm device 2 further comprises a fastener 25, the conductive member 21 is provided with a first hole 211, and the conductive terminal 221 is provided with a second hole 221a. The fastener 25 fixes the conductive member 21 and the conductive terminal 221 after passing through the first hole 211 and the second hole 221a, and then the fastener 15 can be fixed on the battery module 1 after fixing the conductive member and the conductive terminal. The fastener 25 is used to fix the conductive member 21 and the conductive terminal 221 on the battery module 1, which can increase the connection reliability of the conductive member 21, without moving easily. Once the conductive member 21 deviates from the position of the explosion-proof valve 111, the thermal runaway status of the battery module 1 cannot be accurately reflected. After being fixed by the fastener 25, the conductive member 21 is not easy to deviate from the explosion-proof valve 111, thereby ensuring the alarm accuracy for the thermal runaway.

With reference to FIG. 1 and FIG. 3, in the battery pack 100 provided by an embodiment of the present application, the battery module 1 can also comprise a side plate 12 which is fixed on a side of the battery cell 11, an end plate 14 which is fixed on an end of the battery cell 11, and an upper cover 13 which is fixed above the battery cell 11 and is connected to the side plate 12 and the end plate 14, the conductive member 21 being provided on the upper cover 13. Providing the side plate 12 and the end plate 14 can reduce the expansion and deformation of the battery cell 11. Once the battery cell 11 expands, the entire battery module 1 will expand. When the battery module 1 expands, the conductive member 21 can be fractured, and then an alarm of thermal runaway is sent out. By providing the side plate 12 and the end plate 14, such deformation can be effectively inhibited, thereby avoiding a false alarm as the result of the fracture of the conductive member 21 caused by the expansion of the battery module 1, and thereby increasing the thermal alarm accuracy. The upper cover 13 can be made of plastic, so if the conductive member 21 is the conductive tape, the conductive member is pasted on the upper cover 13. The plastic upper cover 13 is easy to melt under heat, thereby ensuring that the conductive member 21 is fused. As mentioned above, the conductive member 21 can extend in the direction in which the explosion-proof valves 111 are arranged. When the conductive member 21 is arranged on the upper cover 13, although the upper cover 13 is provided between the conductive member 21 and the explosion-proof valve 111, the position of the conductive member 21 on the upper cover 13 corresponds to the explosion-proof valve 111. If thermal runaway occurs in the battery module 1, the thermally melt upper cover 13 can ensure the fuse of the conductive member 21. The plastic upper cover 13 can also be provided with an aperture which can be a through hole or a countersink. If the countersink is provided, it is equivalent to thinning the upper cover 13 locally for a quick response to a thermal runaway alarm. If the through hole is provided, the heat directly passes through the through hole to fuse the conductive member 21, which more quickly responds to the thermal runaway alarm.

The material of the upper cover 13 can also be other heat-resistant materials. The upper cover 13 is provided with exhaust holes, which can be elongated and correspond to the direction in which the explosion-proof valves 111 are arranged. The exhaust holes can also be a plurality of independent holes which correspond to the explosion-proof valves 111, respectively. In this way, the erupted electrolytic solution can pass through the above-mentioned exhaust holes to quickly fuse the conductive members 21 and thus timely and accurately respond to the thermal runaway of the battery module.

Further, the battery pack provided in an embodiment of the present application further comprises a vehicle control module. The battery management system is used for sending a first alarm signal to the vehicle control module when the circuit is disconnected, and the vehicle control module can make corresponding control according to the first alarm signal, such as sending an alarm to a passenger or carrying out emergency braking on the vehicle.

The battery pack provided in the embodiment of the present application can also comprise a temperature alarm device and a voltage alarm device, wherein the temperature alarm device is used for monitoring the temperature of the battery module 1 and sending a second alarm signal to the battery management system when the temperature exceeds a set temperature threshold; and the voltage alarm device is used for monitoring the voltage of the battery module 1 and sending a third alarm signal to the battery management system when the voltage exceeds a set voltage threshold. The battery management system can send the alarm signal to the vehicle control module. Through the combination of the temperature alarm device, the voltage alarm device and the thermal alarm device 2, the temperature, the voltage and the thermal runaway of the battery pack are monitored as a whole, thereby increasing the safety of the battery pack.

The foregoing description is merely illustrative of the preferred embodiments of the present application and is not intended to limit the present application, and various changes and modifications to the present application may be made by a person skilled in the art. Any modifications, equivalent replacements, improvements, etc. made within the spirit and principles of the present application shall all fall within the protection scope of this application.

What is claimed is:

1. A battery pack, comprising: two or more battery modules, each of the battery modules comprising a plurality of battery cells which are stacked in sequence,
   wherein each of the battery cells is provided with an explosion-proof valve;
   the battery pack further comprising a thermal alarm device and a battery management system, wherein the thermal alarm device is arranged corresponding to the plurality of explosion-proof valves;
   the thermal alarm device and the battery management system are connected to form a circuit; and a break of the circuit can be caused when at least one of the plurality of explosion-proof valves is exploded;
   wherein the thermal alarm device comprises a plurality of fusible conductive members which are connected in series;
   at least one of the conductive members is fused when at least one of the plurality of explosion-proof valves is exploded; and
   each of the conductive members is strip-shaped, and extends over the plurality of explosion-proof valves of each battery module.

2. The battery pack according to claim 1, wherein each of the conductive members is a conductive tape.

3. The battery pack according to claim 1, wherein the thermal alarm device further comprises an intermediate wire harness, a first lead-out wire harness and a second lead-out wire harness;
   the conductive members are connected end to end via the intermediate wire harness; and
   an end of a conductive member located at a head end is connected to the first lead-out wire harness, and an end of a conductive member located at a tail end is connected to the second lead-out wire harness.

4. The battery pack according to claim 3, wherein each of the intermediate wire harness, the first lead-out wire harness and the second lead-out wire harness have conductive terminals which are fixed with the conductive members.

5. The battery pack according to claim 4, wherein the conductive terminals contained in the first lead-out wire harness and the second lead-out wire harness have the same structures as the conductive terminals of the intermediate wire harness.

6. The battery pack according to claim 4, wherein each of the conductive members is a conductive tape and is fixed to corresponding conductive terminals in an adhesive manner.

7. The battery pack according to claim 4, wherein the thermal alarm device further comprises a plurality of fasteners; and
   each of the fasteners is configured to fix one of the conductive members and a corresponding one of the conductive terminals.

8. The battery pack according to claim 7, wherein each of the conductive members is provided with a first hole;
   each of the conductive terminals is provided with a second hole; and
   each of the fasteners fixes the conductive member and the corresponding conductive terminal after passing through the first hole and the second hole.

9. The battery pack according to claim 7, wherein the fasteners are configured to fix the conductive members and the conductive terminals on each of the battery modules.

10. The battery pack according to claim 1, wherein each of the battery modules further comprises a side plate which is fixed on a side of the battery cells, an end plate which is fixed on an end of the battery cells, and an upper cover which is fixed above the battery cells and is connected to the side plate and the end plate.

11. The battery pack according to claim 10, wherein the conductive members are provided on the upper cover.

12. The battery pack according to claim 11, wherein each of the conductive members is a conductive tape, and the conductive tape is pasted on the upper cover.

13. The battery pack according to claim 10, wherein the upper cover is made of plastic.

14. The battery pack according to claim 1, wherein each of the battery cells comprises a housing and a top cover assembly,
   the housing has an internal space and an opening, and
   the top cover assembly covers the opening of the housing.

15. The battery pack according to claim 14, wherein the anti-explosion valve is provided on the top cover assembly.

16. The battery pack according to claim 14, wherein each of the battery cells comprises an electrode assembly accommodating in the internal space of the housing.

17. The battery pack according to claim 1, wherein the battery pack further comprises a vehicle control module; and
   the battery management system is used for sending a first alarm signal to the vehicle control module when the break of the circuit is caused.

18. The battery pack according to claim 17, wherein the battery pack further comprise a temperature alarm device and a voltage alarm device,
   wherein the temperature alarm device is used for monitoring the temperature of each of the battery modules and sending a second alarm signal to the battery management system when the temperature exceeds a set temperature threshold; and
   the voltage alarm device is used for monitoring the voltage of each of the battery modules and sending a third alarm signal to the battery management system when the voltage exceeds a set voltage threshold.

* * * * *